US008861971B2

(12) United States Patent
Middleton et al.

(10) Patent No.: US 8,861,971 B2
(45) Date of Patent: Oct. 14, 2014

(54) PHASED ANTENNA ARRAY WITH ELECTRO-OPTIC READOUT CIRCUIT WITH MULTIPLEXING AND RELATED METHODS

(75) Inventors: Charles Middleton, Rockledge, FL (US); Alan Mast, Melbourne Beach, FL (US); Jay Kralovec, Viera, FL (US); Richard DeSalvo, Satellite Beach, FL (US); Gus W. Deibner, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 354 days.

(21) Appl. No.: 13/344,447

(22) Filed: Jan. 5, 2012

(65) Prior Publication Data

US 2013/0176165 A1 Jul. 11, 2013

(51) Int. Cl.
*H04B 10/00* (2013.01)

(52) U.S. Cl.
USPC ............................ 398/115; 398/116; 398/118

(58) Field of Classification Search
CPC .. H04B 10/11; H04B 10/112; H04B 10/1121; H04B 10/1125; H04B 10/1129; H04B 10/114; H04B 10/1141; H04B 10/1149; H04B 10/1143; H04B 10/1123; H04B 10/2575; H04B 10/25752; H04B 10/25753; H04B 10/25758; G01S 13/02; H04W 88/085
USPC .................. 398/115, 116, 117, 118, 121, 125
See application file for complete search history.

(56) References Cited

U.S. PATENT DOCUMENTS

| | | | | | |
|---|---|---|---|---|---|
| 4,233,576 | A * | 11/1980 | Pelchat | | 333/16 |
| 5,933,113 | A | 8/1999 | Newberg et al. | | 342/375 |
| 5,999,128 | A | 12/1999 | Stephens et al. | | 342/375 |
| 6,337,754 | B1 * | 1/2002 | Imajo | | 398/115 |
| 6,731,829 | B2 | 5/2004 | Ionov | | 385/15 |
| 6,891,987 | B2 | 5/2005 | Ionov et al. | | 385/15 |
| 7,324,048 | B2 | 1/2008 | Stephens | | 342/375 |
| 7,369,715 | B2 | 5/2008 | Darcie et al. | | 385/3 |
| 7,391,367 | B2 | 6/2008 | Newberg et al. | | 342/375 |
| 7,499,653 | B2 | 3/2009 | Yap | | 398/115 |
| 2005/0013612 | A1 | 1/2005 | Yap | | 398/53 |
| 2008/0260319 | A1 | 10/2008 | Taira et al. | | 385/1 |
| 2008/0278794 | A1 | 11/2008 | Currie et al. | | 359/279 |
| 2011/0129220 | A1 * | 6/2011 | Nawaz et al. | | 398/49 |

* cited by examiner

*Primary Examiner* — M. R. Sedighian
(74) *Attorney, Agent, or Firm* — Allen, Dyer, Doppelt, Milbrath & Gilchrist PA

(57) ABSTRACT

A phased antenna array includes an array of antenna elements, and an electro-optic (EO) readout circuit coupled to the array of antenna elements. The EO readout circuit includes an optical source having a first wavelength division multiplexer (WDM) configured to generate an optical carrier signal including beam carrier wavelengths, a first EO modulator configured to modulate a signal from an antenna element based upon the optical carrier signal, a second WDM coupled downstream from the first EO modulator, and optical-to-electrical converters coupled downstream from the second WDM. The second WDM is configured to multiplex each modulated beam carrier wavelength to a respective optical-to-electrical converter.

15 Claims, 5 Drawing Sheets

PHASED ANTENNA ARRAY WITH ELECTRO-OPTIC READOUT CIRCUIT WITH MULTIPLEXING AND RELATED METHODS

FIELD OF THE INVENTION

The present invention relates to the field of phased antenna arrays, and, more particularly, to phased antenna arrays with optical components and related methods.

BACKGROUND OF THE INVENTION

Wireless communications devices are an integral part of society and permeate daily life. The typical wireless communications device includes an antenna, and a transceiver coupled to the antenna. The transceiver and the antenna cooperate to transmit and receive communications signals.

One particularly advantageous antenna type is the phased array antenna. The phased array antenna comprises a plurality of antenna elements, and processing circuitry to vary the related phase of the signals received from the individual antenna elements. The varying of the related phase of the antenna elements may provide for changing the effective radiation pattern of the antenna. In particular, the radiation pattern can be changed to be highly directional, i.e. reinforcing signals received from one direction and rejecting those received from other directions. Each directional pattern is commonly described as a beam, and the changing of the directional pattern is known as beam forming.

Beam forming operations may be performed either in the analog domain or in the digital domain. For example, in the analog approaches, the phased array antenna includes some form of time delay mechanism downstream from the antenna elements. In digital beam forming applications, the signal from the antenna element is converted into a digital signal, and digital signal processors perform the time delay operations.

As the operational frequency of the phased array antenna increases, the physical size of the individual antenna element becomes smaller. Moreover, the computational requirements for digital beam forming may become onerous. Indeed, as the space between antenna elements becomes constrained, the packaging size for processing components for each antenna element must be reduced. For example, millimeter wave, i.e. extremely high frequency (EHF), phased array antennas may be complex and costly to manufacture. Furthermore, these phased array antennas may be limited in bandwidth and the number of beams.

One approach to the phased array antenna is disclosed in U.S. Pat. No. 5,999,128 to Stephens et al. This phased array antenna includes a plurality of antenna elements, and a plurality of optical paths with varying lengths coupled to the respective antenna elements. The phased array antenna comprises a plurality of phase coherent sources, and a plurality of combiners coupled downstream for the phase coherent sources for providing a signal to the optical paths.

SUMMARY OF THE INVENTION

In view of the foregoing background, it is therefore an object of the present invention to provide a phased antenna array that can operate effectively at high frequencies.

This and other objects, features, and advantages in accordance with the present invention are provided by a phased antenna array comprising an array of antenna elements, and an electro-optic (EO) readout circuit coupled to the array of antenna elements. The EO readout circuit includes an optical source comprising a first wavelength division multiplexer (WDM) configured to generate an optical carrier signal comprising a plurality of beam carrier wavelengths, a first EO modulator configured to modulate a signal from at least one antenna element based upon the optical carrier signal, a second WDM coupled downstream from the first EO modulator, and a plurality of optical-to-electrical converters coupled downstream from the second WDM. The second WDM is configured to multiplex each modulated beam carrier wavelength to a respective optical-to-electrical converter. Advantageously, the phased antenna array converts the electrical signal from the antenna elements to the optical domain for more efficient processing.

More specifically, the EO readout circuit may comprise a local oscillator, and a second EO modulator coupled to the local oscillator and the optical source. The second EO modulator may be configured to generate a local oscillator optical carrier signal comprising a plurality of intermediate beam carrier wavelengths. The EO readout circuit may comprise a third WDM coupled between the second EO modulator and the plurality of optical-to-electrical converters and configured to multiplex each intermediate beam carrier wavelength to the respective optical-to-electrical converter.

Additionally, the EO readout circuit may comprise a plurality of optical couplers coupled between the second WDM and the plurality of optical-to-electrical converters. The plurality of optical-to-electrical converters may be configured to downconvert the modulated beam carrier wavelengths from the first EO modulator based upon the local oscillator optical carrier signal. For example, each the optical-to-electrical converter may comprise first and second optical detectors coupled to a respective optical coupler, and a combiner coupled to the first and second optical detectors.

The EO readout circuit may comprise a plurality of time delay modules coupled between the second WDM and the plurality of optical-to-electrical converters. The array of antenna elements may comprise an array of dual polarization antenna elements.

In some embodiments, the EO readout circuit may comprise a plurality thereof, each EO readout circuit coupled to a respective antenna element. In other embodiments, the EO readout circuit may be coupled to a group of respective antenna elements from the array of antenna elements. The EO readout circuit may comprise an amplifier coupled between the array of antenna elements and the EO readout circuit.

Another aspect is directed to a method of operating a phased antenna array comprising an array of antenna elements, and an EO readout circuit coupled to the array of antenna elements. The method comprises using an optical source comprising a first WDM to generate an optical carrier signal comprising a plurality of beam carrier wavelengths, using a first EO modulator to modulate a signal from at least one antenna element based upon the optical carrier signal, converting the modulated optical signal with a plurality of optical-to-electrical converters downstream from a second WDM, and using the second WDM to multiplex each modulated beam carrier wavelength to a respective optical-to-electrical converter.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
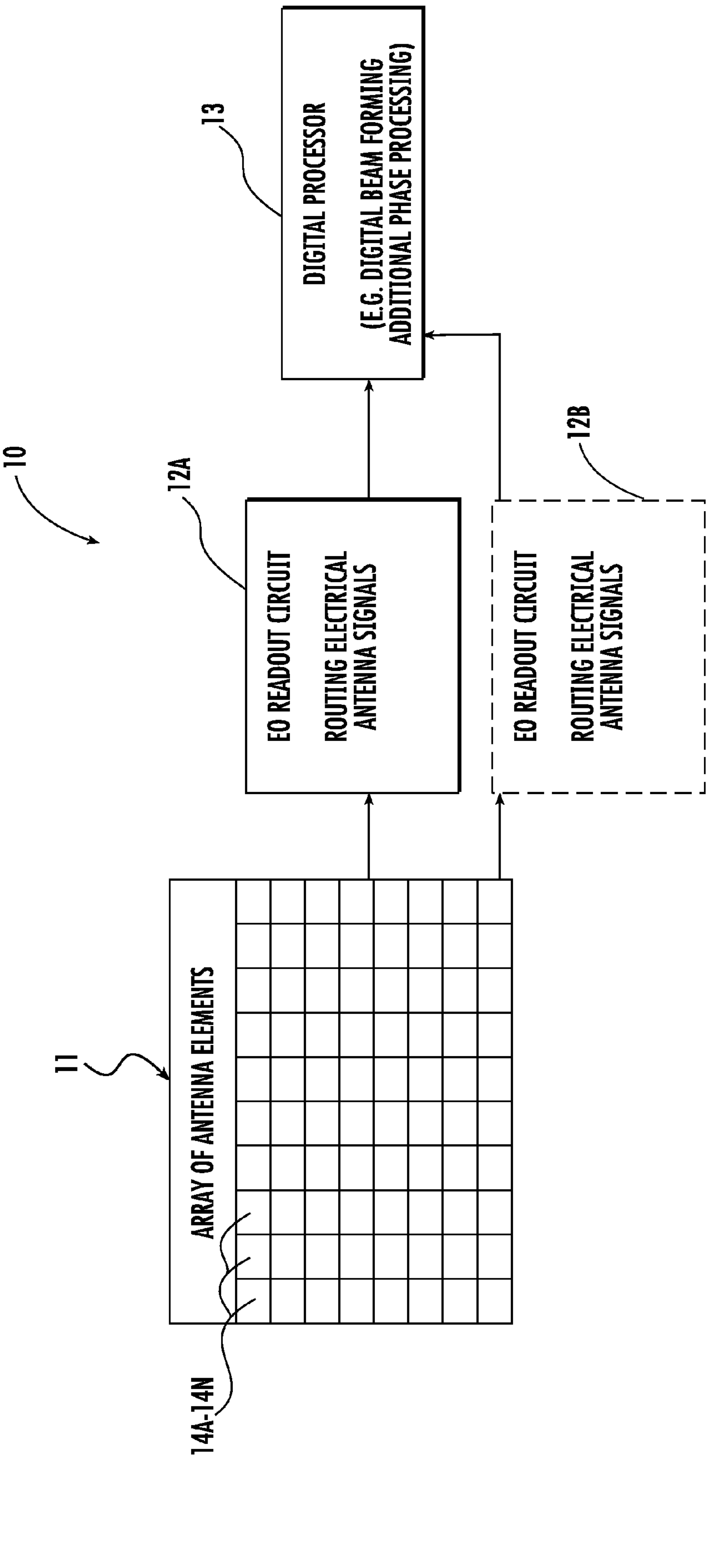
FIG. 1 is a schematic block diagram of a phased array antenna system, according to the present invention.

Referring initially to FIG. 1, a phased antenna array system 10 according to the present invention is now described. The phased antenna array system 10 illustratively includes an array 11 of antenna elements 14*a*-14*n*. As will be appreciated by those skilled in the art, the array 11 of antenna elements is illustrated in a square shape, but could take other shapes, such as a circular array, for example. The phased antenna array system 10 operates as a time domain beam forming array.

The phased antenna array system 10 illustratively includes an EO readout circuit 12*a* coupled to the array 11 of antenna elements, and a digital processor 13 coupled downstream therefrom. The EO readout circuit 12*a* is configured to receive the signals from the array 11 of antenna elements. Shown with dashed lines, the phased antenna array system 10 may also include a second EO readout circuit 12*b* cooperating therewith to receive and process the signals from the array 11 of antenna elements. In particular, each EO readout circuit receives signals from a group of antenna elements 14*a*-14*n*. For example, the phased antenna array system 10 may include a plurality of summers (not shown) upstream of the EO readout circuits 12*a*-12*b* for summing the electrical signals from the respective groups of antenna elements 14*a*-14*n*. In other embodiments, the phased antenna array system 10 may include individual EO readout circuits for each antenna element 14*a*-14*n*, which would provide advantageous beam steering and beam shaping, flexibility, and greater bandwidth.

Figure 2:
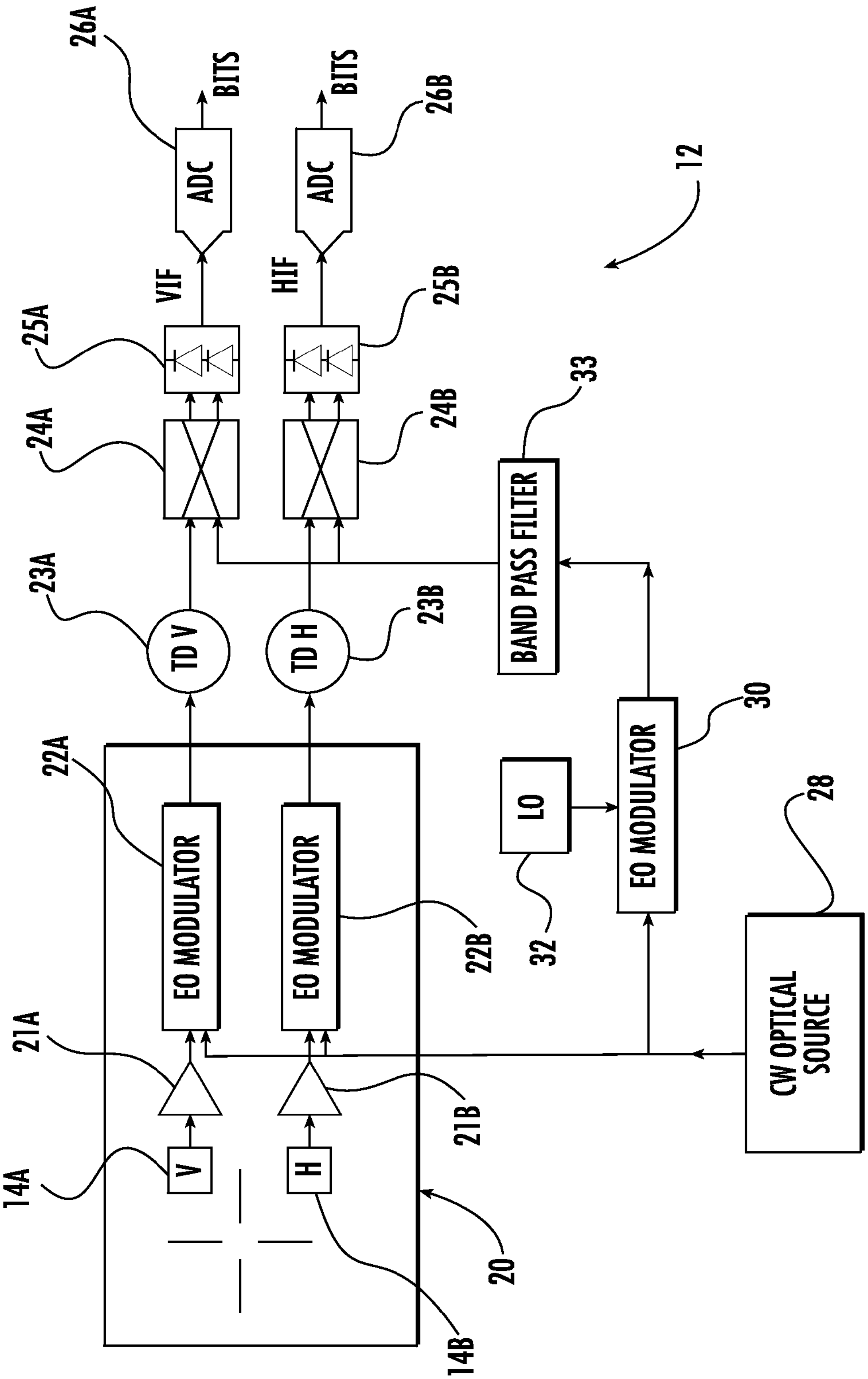
FIG. 2 is a schematic block diagram of the EO readout circuit from the phase array antenna system of FIG. 1.

Referring now additionally to FIG. 2, the EO readout circuit 12 illustratively includes an antenna component module 20, and an optical source 28 coupled thereto and configured to generate an optical carrier signal. For example, the optical source 28 may include a continuous wave (CW) laser. The optical source 28 provides an optical carrier signal comprising a single wavelength.

The antenna component module 20 illustratively includes a pair of antenna elements 14*a*-14*b*, i.e. dual polarity vertical and horizontal oriented antenna dipole elements. In the illustrated embodiment, the antenna component module 20 comprises an integrated component including the antenna elements 14*a*-14*b*, a pair of amplifiers 21*a*-21*b* (e.g. low noise amplifiers) coupled downstream from the antenna elements, and a pair of first EO modulators 22*a*-22*b* configured to modulate a signal from the antenna elements based upon the optical carrier signal. In other embodiments, the antenna element may comprise a separate component and the antenna component module 20 would be installed directly adjacent the antenna element. As will be appreciated by those skilled in the art, the modulated optical signals coming out of the pair of first EO modulators 22*a*-22*b* each have a frequency spectrum including the carrier frequency and a pair of sidebands, i.e. the spectrum of the signal from the antenna elements 14*a*-14*b*.

Nevertheless, the antenna component module 20 is relatively small compared to those of the prior art, which may reduce difficulty in manufacturing the phased antenna array system 10 for high frequencies. Moreover, since the antenna signals are promptly converted to the optical domain, the optical coupling to the output of the antenna component module 20 (e.g. optical fiber, optical waveguide, etc.) can of significant length and without the typical losses of a typical electrical connection. Indeed, the circuitry downstream from the antenna component module 20, discussed below, can be remote to the antenna array 11. As will be appreciated by those skilled in the art, the EO readout circuit 12 may span several miles.

The EO readout circuit 12 comprises a pair of time delay modules 23*a*-23*b* coupled downstream from the pair of first EO modulators 22*a*-22*b*, i.e. for analog time delay beam forming. Of course, in other embodiments, the time delay modules 23*a*-23*b* may be omitted and any needed time delay operations may be accomplished digitally by the digital processor 13.

The EO readout circuit 12 comprises a pair of optical couplers 24*a*-24*b* coupled downstream from the time delay modules 23*a*-23*b*. The pair of optical couplers 24*a*-24*b* combines the modulated optical signals from the pair of first EO modulators 22*a*-22*b*, and provides a pair of combined outputs with 180° of phase difference.

The EO readout circuit 12 also illustratively includes a pair of optical-to-electrical converters 25*a*-25*b* coupled downstream from the optical couplers 24*a*-24*b*, and a pair of analog-to-digital converters 26*a*-26*b* coupled to the pair of optical-to-electrical converters and configured to produce a digital output signal. For example, each optical-to-electrical converter 25*a*-25*b* may comprise first and second optical detectors (e.g. balanced photodiodes) coupled to the optical coupler 24*a*-24*b*, and a combiner coupled to the first and second optical detectors.

The EO readout circuit 12 comprises a local oscillator 32, and a second EO modulator 30 coupled to the local oscillator. The second EO modulator 30 is configured to generate a modulated optical carrier signal commensurate of the LO frequency. The EO readout circuit 12 illustratively includes a band pass filter 33 coupled between the second EO modulator 30 and the pair of optical couplers 24*a*-24*b* and configured to select at least one harmonic of the local oscillator optical carrier signal. The pair of optical couplers 24*a*-24*b* is configured to combine the modulated optical signal from the pair of first EO modulators 22*a*-22*b* and the modulated local oscillator optical carrier signal. These two combined modulated signals interact and mix in the optical-to-electrical converters 25*a*-25*b* to form the intermediate output frequency in the electrical domain. The local oscillator 32 may be configured to provide flexibility in the optical conversion to the intermediate frequency signal. Advantageously, the photonic frequency conversion may generate intermediate frequency signals with wide bandwidth with the advantage of significantly lower undesired mixing spurious signal levels than that encountered in typical RF frequency downconversion systems.

In the illustrated embodiments, the EO readout circuit 12 includes individual paths for each polarized antenna element (horizontal and vertical). Advantageously, this provides isolation for the horizontal and vertical polarizations. Nevertheless, in other embodiments, a group of polarized antenna elements may be coupled to the EO readout circuit 12. In particular, in these embodiments, the signals from the antenna elements 14*a*-14*b* would be combined via a polarization combiner and fed into the EO readout circuit 12. Of course, these embodiments exchange phased antenna array system 10 beam steering and beam shaping flexibility and bandwidth for reduction in components.

Advantageously, the EO readout circuit 12 may provide for a widely tunable front end (i.e. universal frequency converter) that can be coupled to a low-speed, digital beam former back end. In other words, the digital processor 13 may have less computational resources than in typical approaches.

Figure 3:
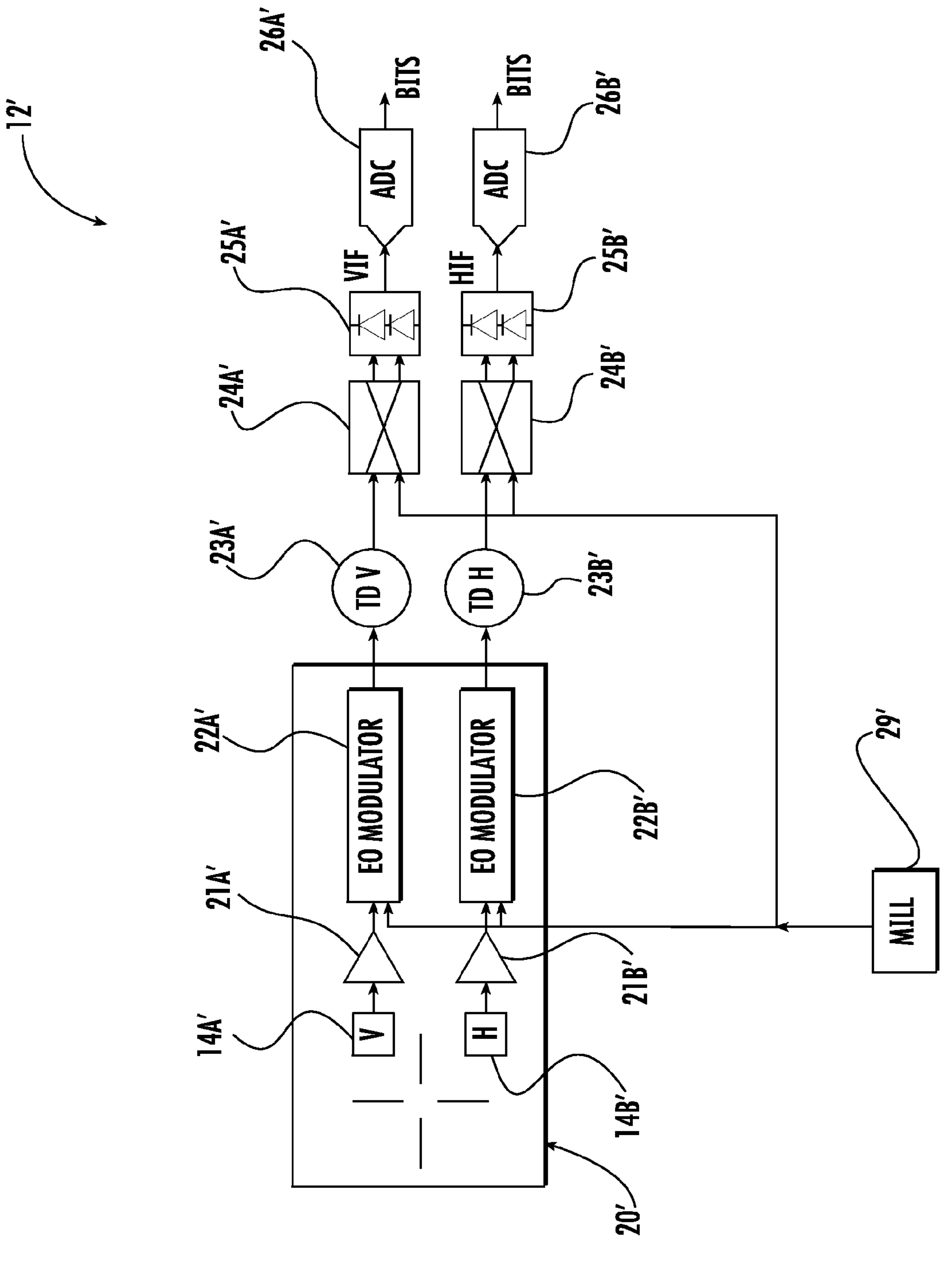
FIG. 3 is a schematic block diagram of another embodiment of the EO readout circuit from the phase array antenna system of FIG. 1.

Referring now to FIG. 3, another embodiment of the EO readout circuit 12' is now described. In this embodiment of the EO readout circuit 12', those elements already discussed above with respect to FIG. 2 are given prime notation and most require no further discussion herein. This embodiment differs from the previous embodiment in that the EO readout circuit 12' operates with a different optical source. In particular, the EO readout circuit 12' includes a mode locked laser (MLL) 29' rather than the oscillator and modulator approach of the embodiment of FIG. 2.

The MLL 29' is configured to generate an optical carrier signal comprising a plurality of beam carrier wavelengths. In other words, each of the locked frequency modes of the MLL 29' is modulated with the signals from the antenna elements. In other embodiments, the EO readout circuit 12' may include optical filters upstream of the pair of modulators 22*a*'-22*b*' and upstream of the optical couplers 24*a*'-24*b*' to address dispersion over wavelength in the modulators or optical components that could add signal jitter to the signal at the optical-to-electrical converters 25*a*'-25*b*'. Moreover, each of these beam carrier wavelengths is worked through the entire path to digital conversion at the pair of analog-to-digital converters 26*a*-26*b*. To this point, each of the locked frequency modes (frequency comb) of the MLL 29' are modulated by the pair of modulators 22*a*'-22*b*'. Advantageously, the MLL 29' provides for low phase noise and potentially a large number of beams.

In particular, the digital processor 13 (FIG. 1) performs digital phase delay operations to accomplish digital beam forming and generates a plurality of beam signals based upon the digital output signal and the plurality of beam carrier wavelengths. Indeed, the horizontal and vertical time delay modules 23*a*'-23*b*' may also be omitted and performed digitally. Advantageously, the direct digitization of the intermediate frequency may permit the generation by the digital processor 13 of large numbers of simultaneous independent beams.

Figure 4:
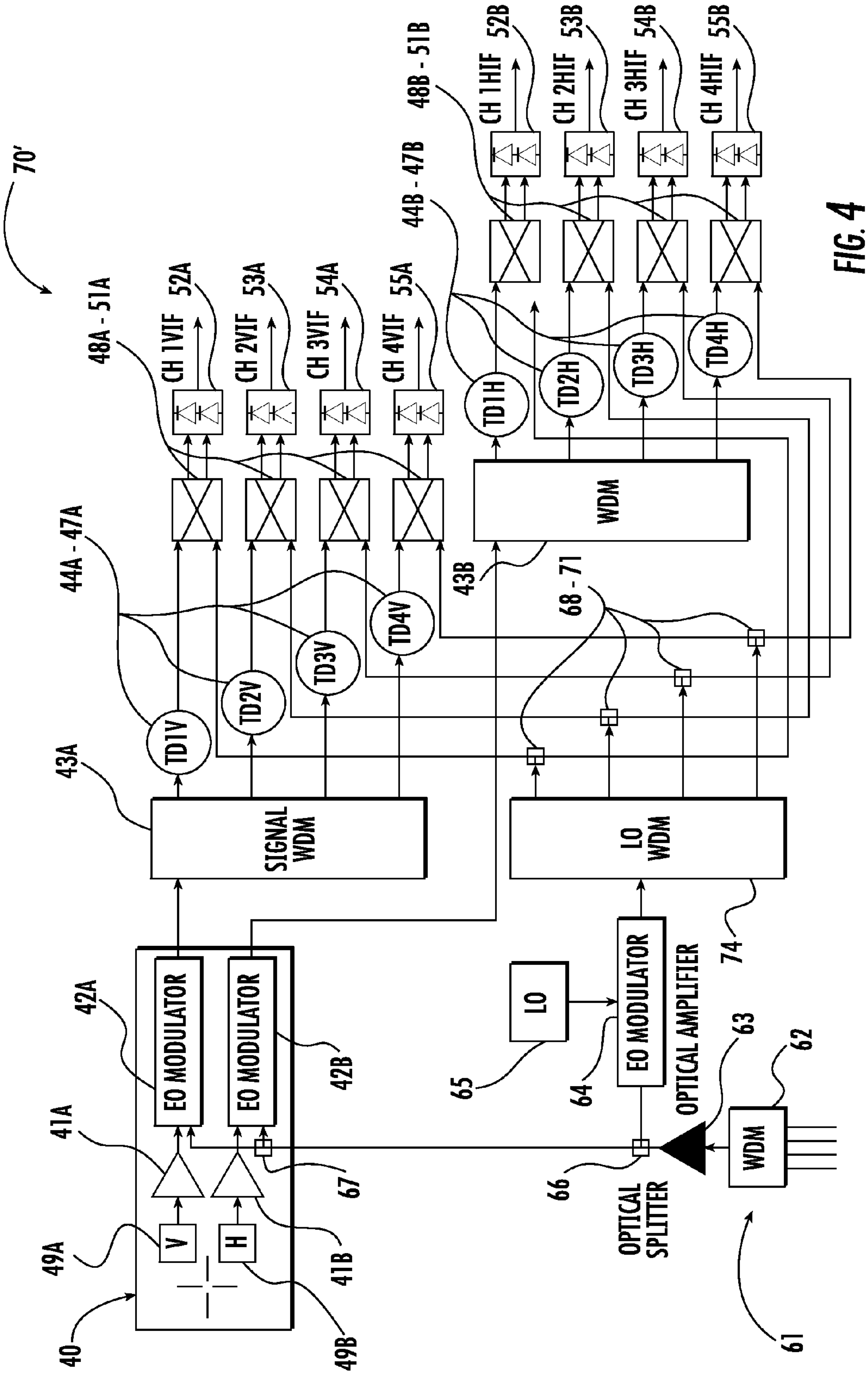
FIG. 4 is a schematic block diagram of another embodiment of the EO readout circuit from the phase array antenna system of FIG. 1.

Referring now to FIG. 4, yet another embodiment of the EO readout circuit 70 for the phased antenna array system 10 is now described. Although the numbering of the components for this EO readout circuit 70 have been changed for ease in illustration, most of the elements from FIG. 2-3 operate similarly to those same elements discussed above. The EO readout circuit 70 illustratively includes an optical source 61 comprising a first wavelength division multiplexer (WDM) 62 configured to generate an optical carrier signal comprising a plurality of beam carrier wavelengths, and an antenna component module 40 coupled to the optical source. In particular, the first WDM 62 is fed with a plurality of optical subcarrier signals, which correspond to the plurality of beam carrier wavelengths and may be produced by a set of CW lasers, for example.

The antenna component module 40 includes a pair of antenna elements 49*a*-49*b*, a pair of amplifiers 41*a*-41*b* coupled downstream from the pair of antenna elements, a pair of first EO modulators 42*a*-42*b* configured to modulate signals from the antenna elements based upon the optical carrier signal, and an optical splitter 67 configured to deliver the optical carrier signal to each first modulator 42*a*-42*b*. As in the embodiments above, the pair of first EO modulators 42*a*-42*b* creates frequency sidebands for each beam carrier wavelength.

The EO readout circuit 70 illustratively includes a pair of second WDMs 43*a*-43*b* coupled downstream from the pair of first EO modulators 42*a*-42*b*, first and second time delay module pluralities 44*a*-47*a*, 44*b*-47*b* coupled downstream from the pair of first EO modulators, first and second optical coupler pluralities 48*a*-51*a*, 48*b*-51*b* coupled downstream from the time delay modules, and first and second optical-to-electrical converter pluralities 52*a*-55*a*, 52*b*-55*b* coupled downstream from the optical couplers. The pair of second WDMs 43*a*-43*b* is configured to multiplex each modulated beam carrier wavelength to a respective optical-to-electrical converter 52*a*-55*a*, 52*b*-55*b*. Each time delay module 44*a*-47*a*, 44*b*-47*b* may be independently controlled. Advantageously, this enables the phased antenna array system 10 to have independent steering for each beam.

The EO readout circuit 70 illustratively includes a local oscillator 65, and a second EO modulator 64 coupled to the local oscillator and the optical source 61. The second EO modulator 64 is configured to generate a local oscillator optical carrier signal comprising a plurality of intermediate beam carrier wavelengths. The EO readout circuit 70 illustratively includes a third WDM 74 coupled between the second EO modulator 64 and the first and second pluralities of optical couplers 48*a*-51*a*, 48*b*-51*b* and configured to multiplex each intermediate beam carrier wavelength to the respective optical-to-electrical converter 52*a*-55*a*, 52*b*-55*b*.

The EO readout circuit 70 includes an optical amplifier 63 configured to generate the optical carrier signal from the optical source 61, and an optical splitter 66 coupled between the optical amplifier and the antenna module 40. As in the embodiment of FIG. 2, the first and second pluralities of optical couplers 48*a*-51*a*, 48*b*-51*b* are configured to downconvert the modulated beam carrier wavelengths from the pair of first EO modulators 42*a*-42*b* based upon the local oscillator optical carrier signal, but in this embodiment, each of the beam carrier wavelengths is downconverted.

More specifically, this EO readout circuit 70 uses the first and second time delay module pluralities 44*a*-47*a*, 44*b*-47*b* to perform optical beam forming. Moreover, in the illustrated embodiment, there are four separate beam signals, but in other embodiments, the number of beams can be increased. Of course, in other embodiments, the first and second time delay module pluralities 44*a*-47*a*, 44*b*-47*b* may be omitted and replaced with digital beam forming in the digital processor 13.

Figure 5:
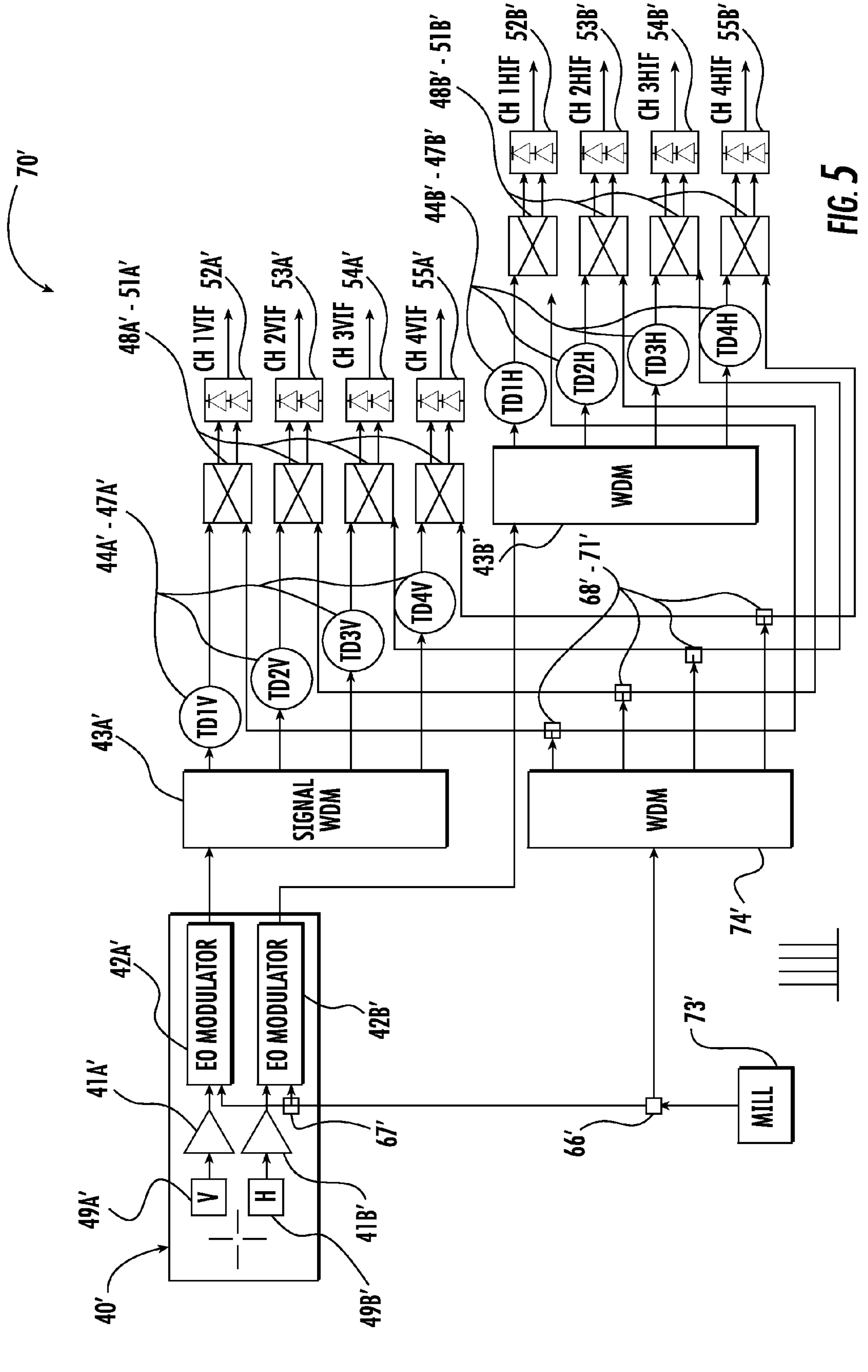
FIG. 5 is a schematic block diagram of yet another embodiment of the EO readout circuit from the phase array antenna system of FIG. 1.

Referring now to FIG. 5, another embodiment of the EO readout circuit 70' is now described. In this embodiment of the EO readout circuit 70', those elements already discussed above with respect to FIG. 4 are given prime notation and most require no further discussion herein. This embodiment differs from the previous embodiment in that the EO readout circuit 70' operates with a different optical source. In particular, the EO readout circuit 70' includes a MLL 73' rather than the oscillator and modulator approach of the embodiment of FIG. 4. In particular, this embodiment operates similarly to the MLL embodiment discussed above with reference to FIG. 3.

Moreover, the optical splitter 66' comprises a reconfigurable wavelength-selective switch/wavelength blocker configured to send signal wavelengths to the aperture and local oscillator wavelengths to the downconverter. In particular, the optical splitter 66' will select the appropriate locked frequency mode (beam carrier wavelength) and output it to the third WDM 74'. Advantageously, the above disclosed EO readout circuits 12, 12', 70, 70' each provides enhanced multi-beam capabilities for the phased antenna array system 10 at greater frequencies than the typical phased antenna array. Other advantages may include lower beamforming signal losses than typical high frequency array and the ability to un-constrain the beam steering and beamforming component packaging density requirements of high frequency arrays.

Other features relating to phased antenna arrays are disclosed in co-pending applications "PHASED ANTENNA ARRAY WITH EO READOUT CIRCUIT AND RELATED METHODS,"; "PHASED ANTENNA ARRAY WITH EO READOUT CIRCUIT WITH MLL AND RELATED METHODS,"; and "PHASED ANTENNA ARRAY WITH EO READOUT CIRCUIT WITH MULTIPLEXING AND MLL AND RELATED METHODS," all incorporated herein by reference in their entirety.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A phased antenna array comprising:

an array of antenna elements; and an electro-optic (EO) readout circuit coupled to said array of antenna elements and comprising:

an optical source comprising a first wavelength division multiplexer (WDM) configured to generate an optical carrier signal comprising a plurality of beam carrier wavelengths, a first EO modulator configured to modulate a signal from at least one antenna element based upon the optical carrier signal, a second WDM coupled downstream from said first EO modulator, and a plurality of optical-to-electrical converters coupled downstream from said second WDM, said second WDM configured to multiplex each modulated beam carrier wavelength to a respective optical-to-electrical converter; and wherein said EO readout circuit comprises a local oscillator, and a second BO modulator coupled to said local oscillator and said optical source, said second EO modulator being configured to generate a local oscillator optical carrier signal comprising a plurality of intermediate beam carrier wavelengths.

2. The phased antenna array of claim 1 wherein said EO readout circuit comprises a third WDM coupled between said second EO modulator and said plurality of optical-to-electrical converters and configured to multiplex each intermediate beam carrier wavelength to the respective optical-to-electrical converter.

3. The phased antenna array of claim 1 wherein said EO readout circuit comprises a plurality of optical couplers coupled between said second WDM and said plurality of optical-to-electrical converters; and wherein said plurality of optical-to-electrical converters is configured to downconvert the modulated beam carrier wavelengths from said first EO modulator based upon the local oscillator optical carrier signal.

4. The phased antenna array of claim 3 each said optical-to-electrical converter comprises:

first and second optical detectors coupled to a respective optical coupler; and a combiner coupled to said first and second optical detectors.

5. A phased antenna array comprising:

an array of antenna elements; and an electro-optic (EO) readout circuit coupled to said array of antenna elements and comprising:

an optical source comprising a first wavelength division multiplexer (WDM) configured to generate an optical carrier signal comprising a plurality of beam carrier wavelengths, a first EO modulator configured to modulate a signal from at least one antenna element based upon the optical carrier signal, a second WDM coupled downstream from said first EO modulator, and a plurality of optical-to-electrical converters coupled downstream from said second WDM, said second WDM configured to multiplex each modulated beam carrier wavelength to a respective optical-to-electrical converter; and wherein said EO readout circuit comprises a plurality of time delay modules coupled between said second WDM and said plurality of optical-to-electrical converters.

6. A phased antenna array comprising:

an array of antenna elements; and a plurality of electro-optic (EO) readout circuits coupled respectively to said array of antenna elements, each EO readout circuit comprising an optical source comprising a first wavelength division multiplexer (WDM) configured to generate an optical carrier signal comprising a plurality of beam carrier wavelengths, a first EO modulator configured to modulate a signal from at least one antenna element based upon the optical carrier signal, a second WDM coupled downstream from said first EO modulator, a plurality of optical-to-electrical converters coupled downstream from said second WDM, said second WDM configured to multiplex each modulated beam carrier wavelength to a respective optical-to-electrical converter, a local oscillator, and a second EO modulator coupled to said local oscillator and said optical source and configured to generate a local oscillator optical carrier signal comprising a plurality of intermediate beam carrier wavelengths.

7. The phased antenna array of claim 6 wherein each EO readout circuit comprises a third WDM coupled between said second EO modulator and said plurality of optical-to-electrical converters and configured to multiplex each intermediate beam carrier wavelength to the respective optical-to-electrical converter.

8. The phased antenna array of claim 6 wherein each EO readout circuit comprises a plurality of optical couplers coupled between said second WDM and said plurality of optical-to-electrical converters; and wherein said plurality of optical-to-electrical converters is configured to downconvert the modulated beam carrier wavelengths from said first a) modulator based upon the local oscillator optical carrier signal.

9. The phased antenna array of claim 8 each said optical-to-electrical converter comprises:

first and second optical detectors coupled to a respective optical coupler; and a combiner coupled to said first and second optical detectors.

10. An electro-optic (EO) readout circuit for a phased antenna array comprising an array of antenna elements, the EO readout circuit comprising:

an optical source comprising a first wavelength division multiplexer (WDM) configured to generate an optical carrier signal comprising a plurality of beam carrier wavelengths;

a first EO modulator configured to modulate a signal from at least one antenna element based upon the optical carrier signal;

a second WDM coupled downstream from said first EO modulator; and a plurality of optical-to-electrical converters coupled downstream from said second WDM;

said second WDM configured to multiplex each modulated beam carrier wavelength to a respective optical-to-electrical converter; a local oscillator; and a second BO modulator coupled to said local oscillator and said optical source, said second EO modulator being configured to generate a local oscillator optical carrier signal comprising a plurality of intermediate beam carrier wavelengths.

11. The EO readout circuit of claim 10 further comprising a third WDM coupled between said second EO modulator and said plurality of optical-to-electrical converters and configured to multiplex each intermediate beam carrier wavelength to the respective optical-to-electrical converter.

12. The EO readout circuit of claim 10 further comprising a plurality of optical couplers coupled between said second WDM and said plurality of optical-to-electrical converters; and wherein said plurality of optical-to-electrical converters is configured to downconvert the modulated beam carrier wavelengths from said first EO modulator based upon the local oscillator optical carrier signal.

13. A method of operating a phased antenna array comprising an array of antenna elements, and an electro-optic (EO) readout circuit coupled to the array of antenna elements, the method comprising:

generating an optical carrier signal comprising a plurality of beam carrier wavelengths using an optical source comprising a first wavelength division multiplexer (WDM);

modulating a signal from at least one antenna element based upon the optical carrier signal using a first EO modulator;

converting the modulated optical signal with a plurality of optical-to-electrical converters downstream from a second WDM;

multiplexing each modulated beam carrier wavelength to a respective optical-to-electrical converter using the second WDM; and generating a local oscillator optical carrier signal comprising a plurality of intermediate beam carrier wavelengths using a local oscillator, and a second EO modulator coupled to the local oscillator and the optical source.

14. The method of claim 13 further comprising multiplexing each intermediate beam carrier wavelength to the respective optical-to-electrical converter using a third WDM coupled between the second EO modulator and the plurality of optical-to-electrical converters.

15. The method of claim 13 further comprising downconverting the modulated beam carrier wavelengths from the first EO modulator based upon the local oscillator optical carrier signal using the plurality of optical-to-electrical converters.

* * * * *